United States Patent
Carter et al.

(10) Patent No.: US 9,741,060 B2
(45) Date of Patent: Aug. 22, 2017

(54) RECURSIVE NAVIGATION IN MOBILE CRM

(75) Inventors: Wayne Carter, Salt Lake City, UT (US); Sridhar Tadepalli, Foster City, CA (US); Rahim Yaseen, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 434 days.

(21) Appl. No.: 13/236,476

(22) Filed: Sep. 19, 2011

(65) Prior Publication Data

US 2012/0124163 A1 May 17, 2012

Related U.S. Application Data

(60) Provisional application No. 61/384,150, filed on Sep. 17, 2010.

(51) Int. Cl.
*G06F 15/16* (2006.01)
*G06Q 30/06* (2012.01)
(Continued)

(52) U.S. Cl.
CPC ......... *G06Q 30/06* (2013.01); *G06F 17/3089* (2013.01); *G06F 17/30424* (2013.01);
(Continued)

(58) Field of Classification Search
CPC ................. H04L 67/02; H04L 67/2823; G06F 17/30424; G06F 17/30569; G06F 17/30595; G06F 17/3089
(Continued)

(56) References Cited

U.S. PATENT DOCUMENTS

| | | | |
|---|---|---|---|
| 5,572,643 A | 11/1996 | Judson | 395/793 |
| 6,128,621 A | 10/2000 | Weisz | |

(Continued)

FOREIGN PATENT DOCUMENTS

| | | | | |
|---|---|---|---|---|
| EP | 1 347 397 A2 | 9/2003 | | G06F 17/20 |
| EP | 1 956 481 A2 | 8/2008 | | G06F 9/44 |

(Continued)

OTHER PUBLICATIONS

Cioroianu, Andrei, Senior Java Developer and Consultant, Devsphere, "Auto-Save JSF Forms with Ajax, Parts 1, 2, and 3," Aug. 7, 2007, 40 pages.

(Continued)

*Primary Examiner* — Oleg Survillo
(74) *Attorney, Agent, or Firm* — Sheppard Mullin Richter & Hampton LLP

(57) ABSTRACT

A method and apparatus for recursive navigation. In one embodiment of the method, a first reply is generated in response to receiving a first request from a mobile device. The first reply is generated as a function of a page definition, and the first reply comprises data selected from a first object of a logical data model, but not a second object of the logical data model. The first and second objects are distinct from each other. A second reply is generated in response to receiving a second request from the mobile device. The second reply is generated as a function of the page definition, and the second reply comprises data selected from the second object but not the first object.

15 Claims, 10 Drawing Sheets

(51) Int. Cl.
*H04L 29/08* (2006.01)
*G06F 17/30* (2006.01)

(52) U.S. Cl.
CPC .. *G06F 17/30569* (2013.01); *G06F 17/30595* (2013.01); *H04L 67/02* (2013.01); *H04L 67/2823* (2013.01)

(58) Field of Classification Search
USPC .......................................................... 709/217
See application file for complete search history.

(56) References Cited

U.S. PATENT DOCUMENTS

| | | |
|---|---|---|
| 6,268,856 B1 | 7/2001 | Bruck et al. .................. 345/357 |
| 6,327,628 B1 | 12/2001 | Anuff et al. .................. 719/311 |
| 6,501,956 B1 | 12/2002 | Weeren et al. ............... 455/463 |
| 6,684,370 B1 | 1/2004 | Sikorsky et al. ............. 715/205 |
| 6,748,569 B1 | 6/2004 | Brooke et al. ............... 715/207 |
| 6,763,343 B1 | 7/2004 | Brooke et al. ............... 717/115 |
| 6,859,820 B1 | 2/2005 | Hauduc et al. ............... 709/203 |
| 6,871,346 B1 | 3/2005 | Kumbalimutt et al. ...... 718/104 |
| 6,925,646 B1 | 8/2005 | Korenshtein ................. 719/328 |
| 6,964,014 B1 | 11/2005 | Parish .......................... 715/205 |
| 6,987,987 B1 | 1/2006 | Vacanti et al. ............. 455/556.2 |
| 7,007,275 B1 | 2/2006 | Hanson et al. ............... 718/101 |
| 7,096,224 B2 | 8/2006 | Murthy et al. |
| 7,120,639 B1 | 10/2006 | de Jong et al. .............. 707/694 |
| 7,139,370 B1 | 11/2006 | Tse ............................ 379/88.17 |
| 7,546,602 B2 | 6/2009 | Hejlsberg et al. |
| 7,555,757 B2 | 6/2009 | Hejlsberg et al. ............ 719/313 |
| 7,574,486 B1* | 8/2009 | Cheng ............... G06F 17/30905 707/999.01 |
| 7,720,861 B1* | 5/2010 | Vasudevan ........ G06F 17/30061 707/770 |
| 7,747,782 B2 | 6/2010 | Hunt et al. .................. 709/246 |
| 7,907,966 B1 | 3/2011 | Mammen ..................... 455/557 |
| 8,131,875 B1 | 3/2012 | Chen et al. .................. 709/246 |
| 8,191,040 B2 | 5/2012 | Hejlsberg et al. ............ 717/114 |
| 8,386,955 B1 | 2/2013 | Weber et al. ................. 715/781 |
| 2002/0046240 A1 | 4/2002 | Graham et al. .............. 709/203 |
| 2002/0078165 A1 | 6/2002 | Genty et al. ................. 709/217 |
| 2002/0140731 A1* | 10/2002 | Subramaniam ....... G06F 3/0481 715/762 |
| 2003/0187984 A1 | 10/2003 | Banavar et al. ............. 709/225 |
| 2003/0191685 A1 | 10/2003 | Reese ............................ 705/14 |
| 2004/0110490 A1 | 6/2004 | Steele et al. ............... 455/412.1 |
| 2004/0181467 A1 | 9/2004 | Raiyani et al. ................. 705/28 |
| 2004/0204116 A1 | 10/2004 | Ben-Efraim et al. ...... 455/104.1 |
| 2004/0220946 A1 | 11/2004 | Krishnaprasad et al. .... 707/100 |
| 2005/0003810 A1 | 1/2005 | Chu et al. .................... 455/418 |
| 2005/0015375 A1 | 1/2005 | Harjanto ........................ 707/10 |
| 2005/0015513 A1 | 1/2005 | Tran ............................ 709/246 |
| 2005/0044197 A1 | 2/2005 | Lai .............................. 709/223 |
| 2005/0060277 A1 | 3/2005 | Zlatanov et al. ................ 707/1 |
| 2005/0091272 A1 | 4/2005 | Smith et al. ............... 707/104.1 |
| 2005/0097526 A1 | 5/2005 | Hauduc et al. ............... 717/136 |
| 2005/0102281 A1* | 5/2005 | Takahashi ........................ 707/3 |
| 2005/0149511 A1* | 7/2005 | Ruthfield .......... G06F 17/30882 |
| 2005/0188353 A1 | 8/2005 | Hasson et al. ............... 717/116 |
| 2005/0216501 A1 | 9/2005 | Cengiz et al. ............ 707/103 R |
| 2005/0273705 A1 | 12/2005 | McCain ....................... 715/513 |
| 2006/0059225 A1 | 3/2006 | Stonehocker et al. ........ 709/202 |
| 2006/0143193 A1* | 6/2006 | Thakkar ................ G06Q 10/10 |
| 2006/0149624 A1 | 7/2006 | Baluja et al. |
| 2006/0173873 A1* | 8/2006 | Prompt et al. ................. 707/100 |
| 2006/0200415 A1 | 9/2006 | Lu ................................. 705/50 |
| 2006/0277271 A1 | 12/2006 | Morse et al. ................. 709/217 |
| 2006/0288280 A1 | 12/2006 | Makela ........................ 715/530 |
| 2007/0061779 A1 | 3/2007 | Dowedeit et al. ............ 717/120 |
| 2007/0078784 A1 | 4/2007 | Donovan et al. ............... 705/71 |
| 2007/0089065 A1* | 4/2007 | Lane .................... G06F 3/0482 715/764 |
| 2007/0100967 A1 | 5/2007 | Smith et al. ................. 709/219 |
| 2007/0150610 A1 | 6/2007 | Vassilev et al. .............. 709/230 |
| 2007/0174330 A1 | 7/2007 | Fox et al. .................... 707/102 |
| 2007/0208704 A1 | 9/2007 | Ives .................................. 707/3 |
| 2007/0214170 A1 | 9/2007 | Lin .............................. 707/102 |
| 2007/0220158 A1 | 9/2007 | Tolgu et al. .................. 709/230 |
| 2007/0287413 A1 | 12/2007 | Kleitsch et al. .............. 455/405 |
| 2007/0300237 A1 | 12/2007 | Neil et al. .................... 719/319 |
| 2008/0028335 A1* | 1/2008 | Rohrabaugh .......... G06F 9/4443 715/800 |
| 2008/0040389 A1 | 2/2008 | Seth et al. ................. 707/104.1 |
| 2008/0072139 A1 | 3/2008 | Salinas et al. ............... 715/238 |
| 2008/0098018 A1 | 4/2008 | King et al. ................... 707/101 |
| 2008/0120393 A1 | 5/2008 | Chen et al. .................. 709/217 |
| 2008/0140624 A1* | 6/2008 | Deck ...................... G06Q 10/06 |
| 2008/0161058 A1 | 7/2008 | Park et al. .................... 455/564 |
| 2008/0172608 A1 | 7/2008 | Patrawala et al. ............ 715/255 |
| 2008/0183758 A1 | 7/2008 | Kennedy .................. 707/104.1 |
| 2008/0198156 A1 | 8/2008 | Jou et al. ..................... 345/418 |
| 2008/0222242 A1 | 9/2008 | Weiss et al. ................. 709/203 |
| 2008/0222269 A1 | 9/2008 | Major et al. ................. 709/217 |
| 2008/0228758 A1 | 9/2008 | Aaltonen et al. ................. 707/5 |
| 2008/0281866 A1 | 11/2008 | Claussen et al. ......... 707/103 Y |
| 2008/0288881 A1 | 11/2008 | Aaltonen et al. ............ 715/764 |
| 2009/0003603 A1 | 1/2009 | Wessel et al. ................ 380/255 |
| 2009/0005087 A1 | 1/2009 | Lunati et al. ................. 455/466 |
| 2009/0005122 A1 | 1/2009 | Goldfarb ...................... 455/564 |
| 2009/0006338 A1 | 1/2009 | Ives et al. ....................... 707/3 |
| 2009/0070667 A1 | 3/2009 | Zlatanov et al. ............. 715/243 |
| 2009/0083232 A1 | 3/2009 | Ives et al. ........................ 707/3 |
| 2009/0094417 A1 | 4/2009 | Carlson et al. ............... 711/137 |
| 2009/0100096 A1 | 4/2009 | Erlichson et al. ......... 707/104.1 |
| 2009/0172101 A1 | 7/2009 | Arthursson ................... 709/205 |
| 2009/0177685 A1* | 7/2009 | Ellis et al. ................ 707/103 R |
| 2009/0193141 A1 | 7/2009 | Suresh ......................... 709/235 |
| 2009/0248658 A1 | 10/2009 | Mika |
| 2009/0254611 A1 | 10/2009 | Pena et al. ................... 709/203 |
| 2009/0271762 A1 | 10/2009 | Taylor et al. |
| 2010/0010671 A1 | 1/2010 | Miyamoto .................... 700/247 |
| 2010/0049984 A1 | 2/2010 | Masushio et al. ............ 713/179 |
| 2010/0083277 A1 | 4/2010 | Malladi et al. .............. 719/313 |
| 2010/0174602 A1 | 7/2010 | Zweben et al. ............ 705/14.41 |
| 2010/0174717 A1 | 7/2010 | Fambon et al. ............. 707/741 |
| 2010/0191777 A1 | 7/2010 | Ylonen ........................ 707/803 |
| 2010/0228880 A1 | 9/2010 | Hunt et al. ................... 709/246 |
| 2010/0235473 A1 | 9/2010 | Koren et al. ................ 709/219 |
| 2010/0262780 A1 | 10/2010 | Mahan et al. ................ 711/118 |
| 2010/0299438 A1 | 11/2010 | Zimmerman et al. ........ 709/226 |
| 2010/0299588 A1* | 11/2010 | Dattilo et al. ................ 715/234 |
| 2010/0332586 A1 | 12/2010 | Jogand-Coulomb et al. ........................... 709/203 |
| 2010/0333153 A1 | 12/2010 | Sahota et al. ................... 725/97 |
| 2011/0066982 A1* | 3/2011 | Paulsami ............... G06F 3/0482 715/835 |
| 2012/0047445 A1* | 2/2012 | Rajagopal .......... G06F 17/30902 715/747 |
| 2012/0071146 A1 | 3/2012 | Shrivastava et al. ....... 455/414.3 |
| 2012/0071155 A1 | 3/2012 | Carter et al. ............... 455/422.1 |
| 2012/0072477 A1 | 3/2012 | Carter et al. ................. 709/201 |
| 2012/0072498 A1 | 3/2012 | Carter et al. ................. 709/204 |
| 2012/0079009 A1 | 3/2012 | Carter et al. ................. 709/203 |
| 2012/0079367 A1 | 3/2012 | Carter et al. ................. 709/201 |
| 2012/0089695 A1 | 4/2012 | Fainberg et al. ............. 709/213 |
| 2012/0151000 A1 | 6/2012 | Snodgrass et al. ........... 709/217 |
| 2013/0007016 A1 | 1/2013 | Saxena ......................... 707/748 |
| 2013/0275854 A1 | 10/2013 | Lim et al. .................... 715/234 |
| 2013/0282986 A1 | 10/2013 | Allen et al. .................. 711/137 |

FOREIGN PATENT DOCUMENTS

GB    EP 0908833 A2 *   4/1999   ....... G06F 17/30882
WO    WO 2008/101236 A1   8/2008

OTHER PUBLICATIONS

Genest, Aaron et al., Looking Ahead: Comparison of Page Preview Techniques for Goal-Directed Web Navigation, International Federation for Information Processing, 2009, pp. 378-391, (14 pages).

(56) References Cited

OTHER PUBLICATIONS

Jones, Robert, "Creating Web Content for Mobile Phone Browsers, Part 1," Feb. 6, 2004; pp. 1-7, (7 pages).
Cooperman, Gene et al., "Marshalgen: Marshaling Objects in the Presence of Polymorphism", College of Computer and Information Science, 161 CN; Northeastern University, Boston, MA; MA IPPS/SPDP;1999; pp. 616-622 (7 pages).

* cited by examiner

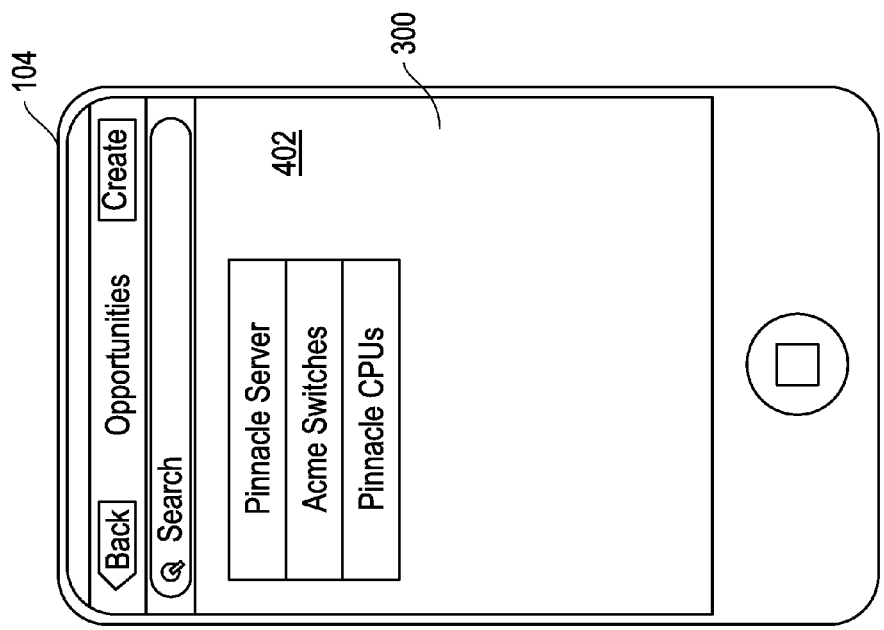
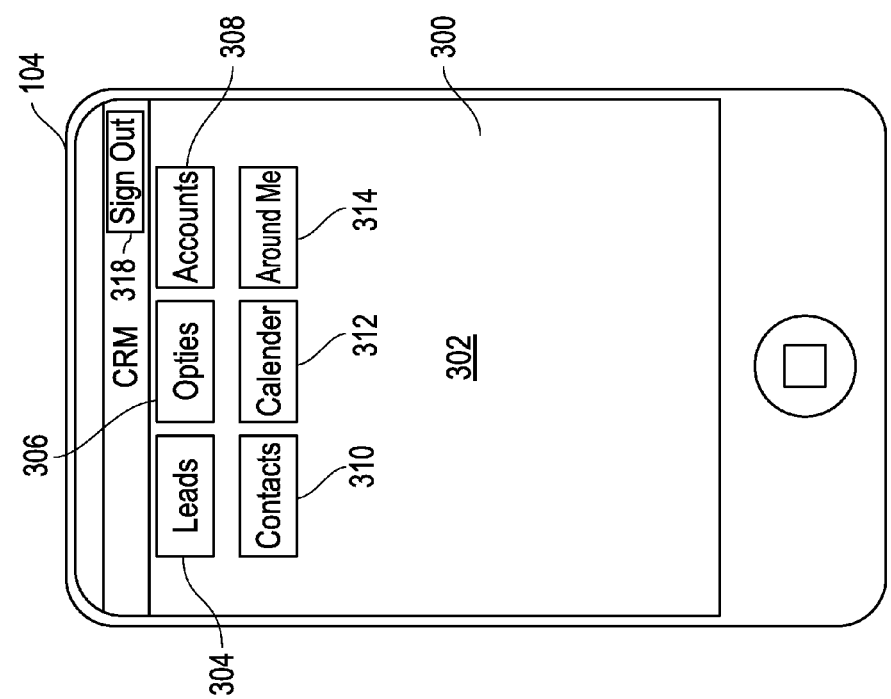
FIG. 4
FIG. 3

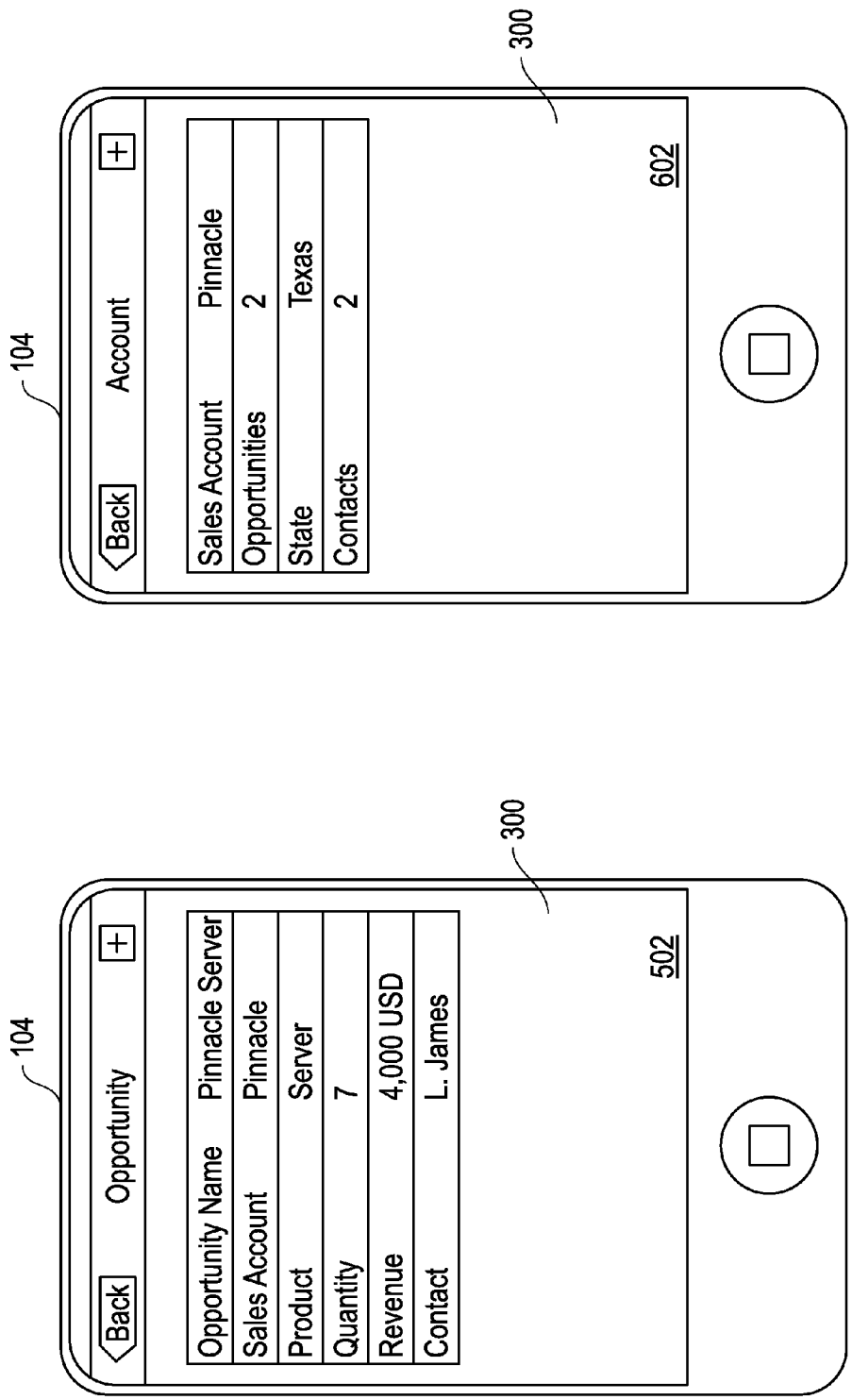

RECURSIVE NAVIGATION IN MOBILE CRM

CROSS-REFERENCE TO RELATED APPLICATIONS

This application claims priority to Provisional Application No. 61/384,150 filed on Sep. 17, 2010, and is incorporated herein in its entirety by reference.

BACKGROUND OF THE INVENTION

Enterprise applications are integral parts of many businesses and provide valuable services to its users. For example, enterprise applications provide customer relationship management (CRM), resource planning, human resource management, etc. The present invention will be described with reference to an example CRM that provides sales and marketing services to its users, it being understood that the present invention should not be limited thereto.

CRM is a widely implemented strategy for managing a company's interaction with customers, clients, and sales prospects. CRM involves technology to organize, automate, and synchronize business processes-principally sales activities, but also those for marketing, customer service, and technical support. The overall goals of CRM are to find, attract, and win new clients, nurture and retain those the company already has, etc.

CRM services can be accessed by users via a desktop computer system that is coupled to a data processing system the implements the CRM. CRM services can also be accessed through mobile devices (e.g., smart phones or tablet computers). The present invention will be described with reference to providing CRM services to users via their mobile devices, it being understood that the present invention should not be limited thereto.

SUMMARY

A method and apparatus for recursive navigation. In one embodiment of the method, a first reply is generated in response to receiving a first request from a mobile device. The first reply is generated as a function of a page definition, and the first reply comprises data selected from a first object of a logical data model, but not a second object of the logical data model. The first and second objects are distinct from each other. A second reply is generated in response to receiving a second request from the mobile device. The second reply is generated as a function of the page definition, and the second reply comprises data selected from the second object but not the first object.

BRIEF DESCRIPTION OF THE DRAWINGS

The present invention may be better understood, and its numerous objects, features, and advantages made apparent to those skilled in the art by referencing the accompanying drawings.

FIG. 3 graphically illustrates an example page displayed on a mobile device employed in FIG. 1.

FIG. 4 graphically illustrates an example page displayed on a mobile device employed in FIG. 1.

FIG. 5 graphically illustrates an example page displayed on a mobile device employed in FIG. 1.

FIG. 6 graphically illustrates an example page displayed on a mobile device employed in FIG. 1.

The use of the same reference symbols in different drawings indicates similar or identical items.

DETAILED DESCRIPTION

Today's sales and marketing workforce is more mobile than ever. To reduce sales downtime, increase customer face time, and win more deals, many companies now employ mobile CRM to move their business forward while employees are on the road. Mobile CRM enable users to more efficiently use CRM services such creating, reviewing, and/or updating sales opportunities, contacts, leads, calendar entries, etc., through user interfaces (UIs) or pages displayed on their mobile devices.

Figure 1:
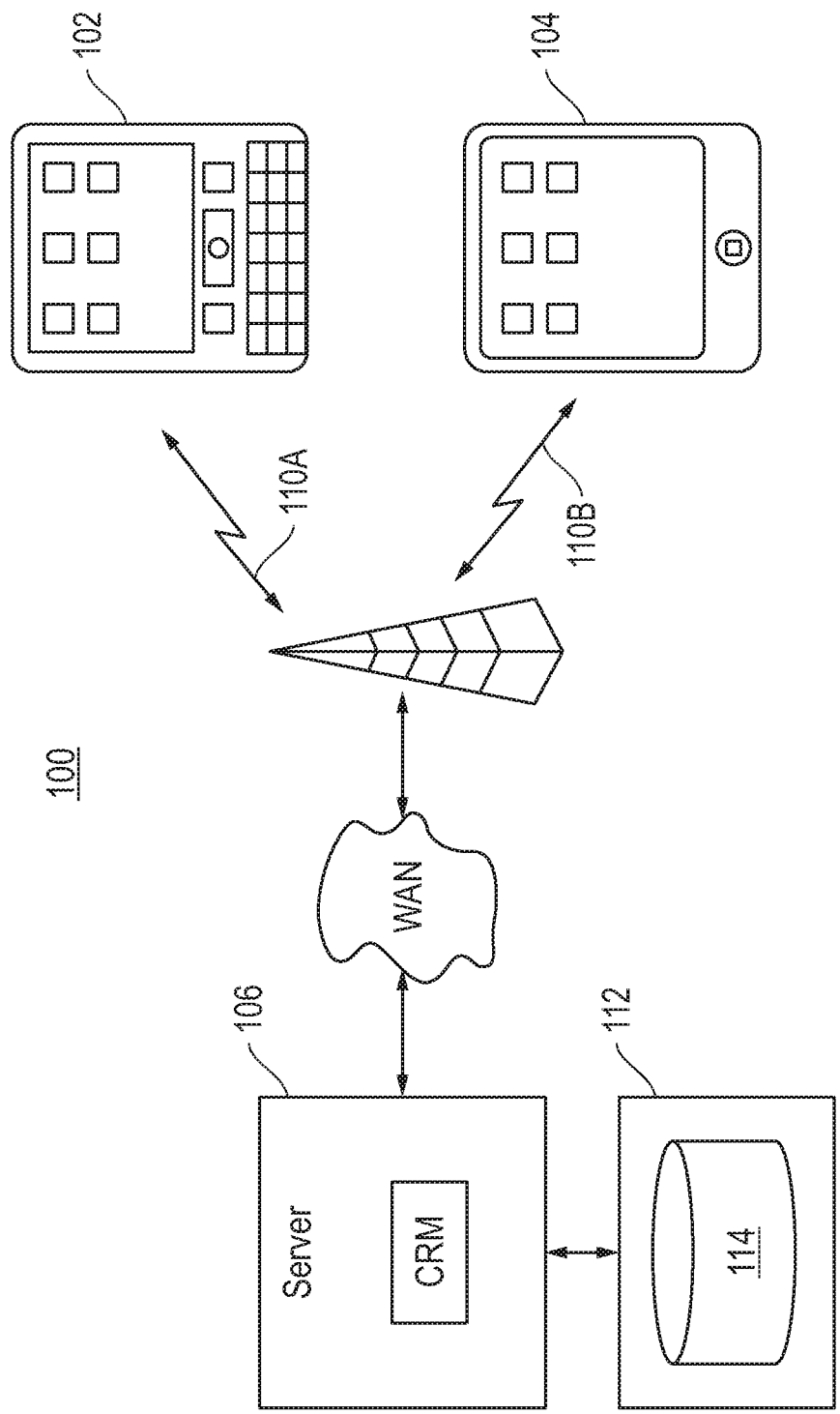
FIG. 1 graphically illustrates relevant components of an example system that employs mobile CRM.

FIG. 1 illustrates in block diagram form, relevant components of a system 100 that provides an example mobile CRM. System 100 includes mobile devices (e.g., smart phones) 102 and 104 in wireless communication with a CRM executing on server 106. Services provided by the CRM can be accessed via user interfaces (hereinafter also referred to as pages) sent by server 106 and displayed by mobile devices 102 or 104. As will be more fully described below, the CRM operates with mobile devices that are substantially different in design and operation. In other words, the CRM is designed to be independent of mobile device features including distinct look and feel thereof.

The CRM implements a model-view-controller architecture. The CRM includes a single, metadata driven application that contains multiple views or page definitions. In response to receiving a page request from mobile device 102 or 104, the CRM merges or binds data of a logical data model with a selected page definition, the result of which is serialized and sent to the mobile device 102 or 104 as a reply to its request. Mobile device 102 or 104 receives the reply, deserializes content and displays a corresponding page that includes visual representations of the merged data and other components. The page can be displayed with a look and feel that is native to the mobile device 102 or 104.

The CRM executing on server 106 is in data communication with a storage system 112 that includes one or more relational databases 114. For the purposes of explanation only, storage system 112 is presumed to include a single database 114 that stores data of business objects of a logical data model. An object may represent a logical entity that stores a set of instance variables or properties, also known as attributes, and associations with other business objects, thereby weaving a map of objects representing business relationships. A business object may represent a data entity that may contain related data held in one or more tables of the relational database 114. A business object may be made of business components that map to these tables. A business object is an object type that glues related business components together. A business component is said to provide a layer of wrapping over the tables. Opportunities, Accounts, and Contacts are examples of business objects.

Figure 2:
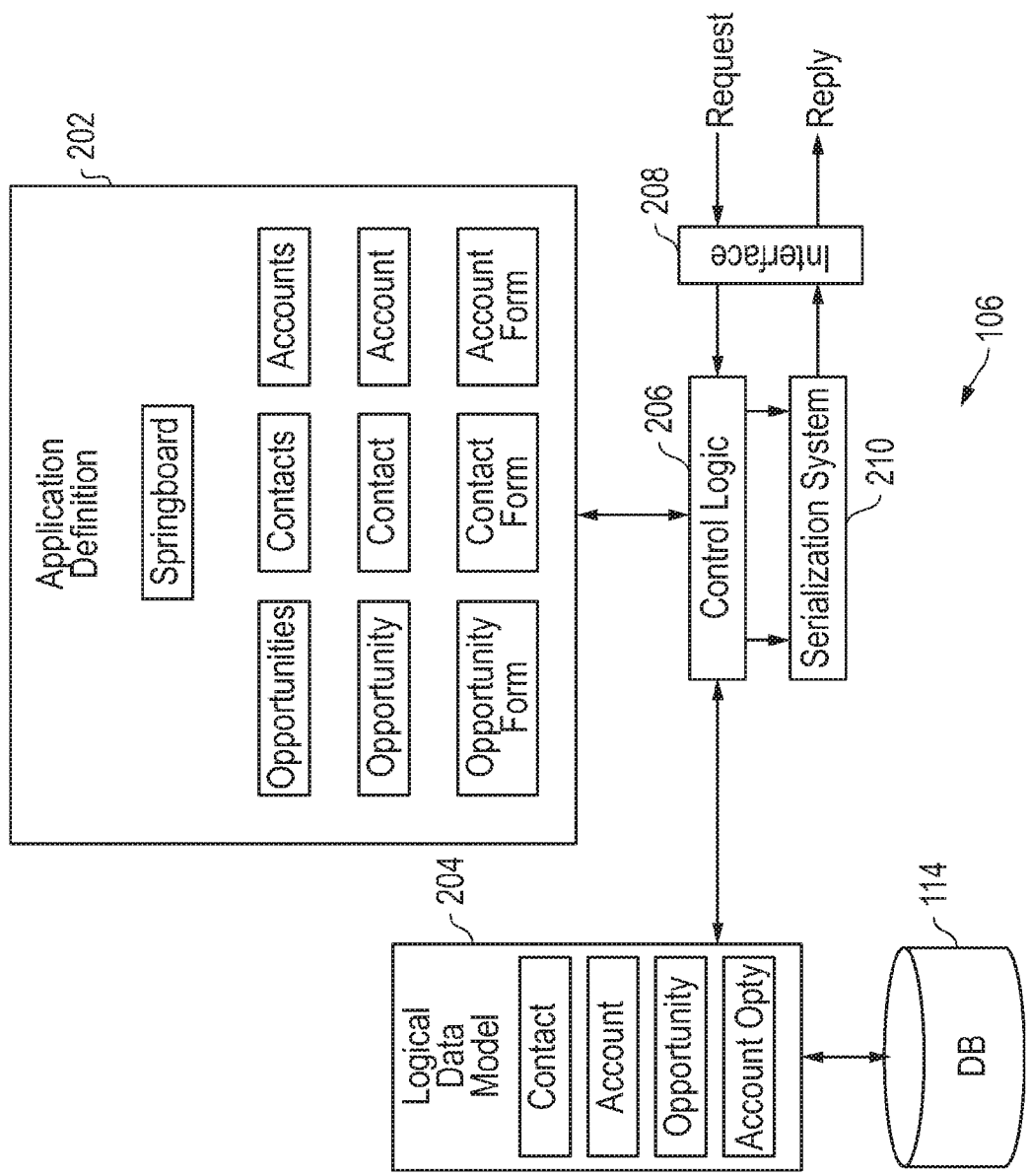
FIG. 2 graphically illustrates relevant components of an example server employed in FIG. 1.

With continuing reference to FIG. 1, FIG. 2 illustrates an example of server 106 from FIG. 1 with relevant components shown in block diagram form. Memory 202 stores an application definition for the CRM. The application definition includes page definitions (also known as "views"), some of which are visually represented. Page definitions form the basis of pages that can be displayed by mobile devices 104 or 106. Each of the page definitions can be used to render a page on any or all of mobile devices 102 or 106. Example page definitions are visually represented in memory 202. The "springboard" page definition can be used to render a page with icons arranged in a two-dimensional pattern. Each icon may represent a mini-application or high level business object within the logical data model. The "accounts," "opportunities," and "contacts" page definitions can be used to render pages with names or other information of accounts, opportunities, and contacts, respectively, in a list pattern. The "account," "opportunity," and "contact" page definitions can be used to render pages with data from an account, opportunity, and contact, respectively, in a form pattern. The "account form," "opportunity form," and "contact form" page definitions can be used to render pages with data from an account, opportunity, and contact, respectively, in a user editable form pattern. Other page definitions in memory 202 are contemplated.

The application definition in memory 202 can be built using Java Server Faces (JSF) technology, it being understood the present invention should not be limited thereto. JSF provides standard, reusable components for creating pages that can be displayed on mobile devices. JSF provides useful, special tags to enhance page definitions. Each tag gives rise to an associated component. JSF can also be used to map page components to a data model, identify resources to be employed by the mobile devices, etc. While page definitions run on server 106, they are displayed on mobile devices 102 or 106.

Page definitions can be used to render logical data model 204 into a form suitable for interaction by a user of a mobile device via a page displayed thereon. Logical data model 204 manages the business object data of the application definition, responds to requests for information about its state (usually from a page definition), and responds to instructions to change state from control logic 206. In one sense, logical data model 204 provides access to business objects including account, contact, opportunity, etc., some of which are visually represented in FIG. 2. The logical data model 204 is both the data and the business/domain logic needed to manipulate the data of the application definition.

Control logic 206, which may take form in instructions executing on a processor, is in data communication with the application definition contained within memory 202 in addition to being in data communication with interface 208 and serialization system 210. Control logic 206 can receive a page request from any of the mobile devices 102 or 104 via interface 208. In response to receiving the page request, control logic 206 may access the application definition in memory 202 or a page navigation stack, which will be more fully described below, to select the appropriate page definition, or relevant components thereof, which is needed to form the proper reply to the request. The page definition retrieved from memory 202 or from the page navigation stack is selected based on information contained in the page request. The selected page definition may contain metadata that is used to retrieve data needed from an appropriate business object of logical data model 204. Control logic 206 can make calls on business objects of logical data model 204 to retrieve the data needed by the page definitions. Serialization system 210 can bind or merge the selected page definition with data retrieved from the business object, the result of which is subsequently serialized and transmitted to the requesting mobile device as a reply. FIGS. 3-9 illustrate example pages that are displayed by mobile device 102 in response to receiving replies from the CRM. These pages also illustrate an example of recursive navigation as will be more fully described.

With continuing reference to FIG. 2, FIG. 3 illustrates an example page that is displayed on a touch sensitive screen 300 of mobile device 104 in response to a user's invocation of a session with the CRM. More particularly, when the user starts a session with the CRM, mobile device 104 generates and sends a request to the CRM for the springboard page. In response to receiving the request, control logic 206 selects the springboard page definition in memory 202. Serialization system 210 in turn renders and serializes a reply using the springboard page definition. Mobile device 104 displays page 302 with actionable icons 304-314 in response to receiving the reply from the CRM. Icons 304-314 correspond to high level business objects or mini applications of the CRM.

After springboard page 302 is displayed on mobile device 104, the user can access various CRM services via icons 304-314. To illustrate, the user can activate the opportunities icon 306 in order to retrieve a list of opportunities that may be of interest. In response to activation of icon 306, mobile device 104 generates and sends a request for the opportunities page to the CRM. The page request and subsequent page requests should include session identification or other information that uniquely identifies the session between the CRM and mobile device 104. As will be more fully described below the CRM can use session identifications to manage page navigation stacks for respective mobile devices.

Control logic 206 receives the request from mobile device 104, and in response selects the opportunities page definition from memory 202 based on information contained in the request. The selected opportunities page definition is provided to serialization system 210 for rendering. During this process, control logic 206 selects an object (hereinafter also referred to as an entry) of model 204 that stores data needed for the reply. The model entry selection may be based on information in the selected page definition and/or other information, such as information contained in the last item entered in a respective page navigation stack. In the current example, control logic 206 selects the opportunity entry of model 204 to provide data that is identified directly or indirectly by the opportunities page definition. Data selected and retrieved from opportunity entry is merged with the opportunities page definition, the result of which is serialized and transmitted to mobile device 104. Additionally, control logic 206 may push a new item onto the navigation page stack mentioned when the reply is sent to mobile device 104. The new stack item should contain information related to the reply such as a copy of the page definition (e.g., opportunities page definition) that was used to render the reply and an identity of the model entry (e.g., the opportunity model entry) from which data was retrieved for the reply.

FIG. 4 shows an example "Opportunities" page 402 displayed by mobile device 104 after it receives and deserializer the reply sent by the CRM. Like other pages presented in a list pattern, page 402 illustrates intent to display elements (e.g., opportunities) in a list. Each opportunity (e.g., "Pinnacle Server") in the list may be actionable (e.g., an active page link). For purposes of explanation, it will be presumed that each item in a list pattern displayed by a mobile device is an active page link. The user can forward navigate or "drill down" to access more detailed information about any of the opportunities by activating the corresponding page link. To illustrate, the user can activate the "Pinnacle Server" link displayed by page 402. In response, mobile device 104 generates and sends a request for the Pinnacle Server opportunity page. Control logic 206 receives this request, and selects the opportunity page definition based on information in the request. The selected opportunity page definition is provided to serialization system 210. Control logic 206 selects a model entry to provide data identified directly or indirectly by the opportunity page definition. The selection can be based on the selected opportunity page definition and/or information in the last item pushed onto the corresponding page navigation stack. In the current example, the opportunity model entry is selected. As will be more fully described below, root entries in model 204 such as the opportunity model entry are selected for page definitions that are backed by a single row of model data.

Data is selected and retrieved from the opportunity entry and is merged with the opportunity page definition, the result of which is serialized and transmitted to mobile device 104. Additionally, control logic 206 creates and pushes a new item onto the navigation page stack. The new page stack item should contain information (e.g., the identity of the opportunity entry of model 204, a filter value unique to the Pinnacle Server opportunity, a copy of the opportunity page definition, etc.) corresponding to the reply sent to mobile device 104.

FIG. 5 shows an example of the "Pinnacle Server opportunity" page 502 displayed by mobile device 104 after it receives and deserializes the reply from the CRM. Like other pages presented in a form pattern, page 502 illustrates intent to display elements in a form. The Pinnacle Server opportunity page 502 has a look and feel of other pages displayed by mobile device 104 such as the opportunities page 402 shown in FIG. 4. For example, both pages 402 and 502 include a "Back" button that can be used to backward navigate to the prior page. If the Back button of page 502 is activated, mobile device 104 will generate and send a Back request to the CRM. In one embodiment, the same generic Back request is sent by mobile device 104 whenever any Back button in any page is activated. In response to the Back request, the control logic 206 can pop the last item off the page navigation stack, which item includes information related to page 502. Then, control logic 206 can recreate the reply that resulted in page 402, using the page definition (e.g., opportunities page definition) in the most recently added stack item, and data from the model entry (e.g., opportunity model entry) identified in the most recently added stack item. The reply is recreated for subsequent serialization and transmission to the mobile device 104. The redisplay of the page should be the same except for any data from the model that has changed in the interim.

Returning to FIG. 5, many elements displayed in the "Pinnacle Server opportunity" page 502 are actionable page links. For example, the "Pinnacle" sales account is an active link to a corresponding account page. To illustrate, a user of mobile device 104 can activate the Pinnacle sales account page link displayed on mobile device 104. In response to activation of this page link, mobile device 104 generates and sends a request for the Pinnacle account page to the CRM. Control logic 206 receives this request, and in response selects the account page definition memory 202 based on information in the request. The account page definition is provided to serialization system 210 for rendering. During this process, control logic 206 selects the appropriate entry of model 204, which stores the data that is needed to render the pinnacle account reply. The account entry may be selected based upon information contained within the selected page definition and/or information in the most recently added item to the corresponding page stack. In the current example, the account entry of model 204 is selected to provide data for the page definition since the account page definition is backed by a single row of model data. Data is selected by control logic 206 from the account entry of model 204 that is identified directly or indirectly by the account page definition. The selected data is merged with the account page definition and subsequently serialized for transmission to mobile device 204. Additionally, control logic 206 may create and push a new item onto the corresponding navigation page stack, which may contain the account model entry identity, information unique to the Pinnacle account, a copy of the account page definition that was used to render the reply, etc.

FIG. 6 illustrates an example "Pinnacle" account page 602 displayed by mobile device 104 after it receives and deserializes the reply from the CRM. Like the opportunity page 502 shown in FIG. 5, the account page 602 is presented in a form pattern. One or more elements in account page 602 can be active page links in an account page. For example, the "Opportunities" and "Contacts" elements of page 602 are both active page links. The Opportunities page link can lead to an opportunities page that lists all and only opportunities for the Pinnacle sales account. And the Contacts page link can lead to a contacts page that lists all and only contacts for the Pinnacle sales account. A user can forward navigate to these subsequent pages by activating either of the active links. To illustrate, the Opportunities link of page 602 can be activated by the user, and in response mobile device 104 generates and sends an opportunities page request to the CRM. This page request may be similar or identical to the opportunities page request that was sent by mobile device 104 in response to user activation of the opportunities icon 306 of FIG. 3. The control logic 206 receives the request, and in response selects the opportunities page definition from memory 202 based on information in the request. The opportunities page definition is provided to serialization system 210 for rendering. Control logic 206 also selects an entry of model 204 that stores data needed by opportunity page definition. The selection of the model entry can be based on the information of the opportunity page definition and/or information in the item that was most recently added to the page stack. In this current example, control logic 206 selects the AccountOpportunity entry of model 204, which is related to the Account root entry, since the opportunities page was selected, and Account is the model entry identified in the most recently pushed item to the page navigation stack. In one embodiment, if the selected page definition (e.g., the opportunities page definition) is or can be backed by multiple rows of the data model, the control logic 206 should select the model entry that results by concatenating the identity of the model in the most recently pushed stack item with the identity of the root entry, which is identified in the selected page definition, if they differ. In the current example, the opportunities page definition is or can be backed by multiple rows, "Account" is identified as the model entry in the most recently pushed item of the page navigation stack, and Opportunity is identified as the root model entry in the opportunities page definition. As a result, control logic 206 concatenates the two to create AcountOpportunity, which is selected as the model entry from which serialization system 210 should receive data for the reply. Control logic 206 selects data from the AccountOpportunity entry of model 204 that is directly or indirectly identified by the opportunities page definition. The selected data is merged with the opportunities page definition, the result of which is serialized and transmitted in mobile device 104. Additionally, control logic 206 pushes a new item onto the navigation page stack that identifies the AccountOpportunity model entry, a copy of the opportunities page definition, and identifier unique to Pinnacle sales account.

Figure 8:
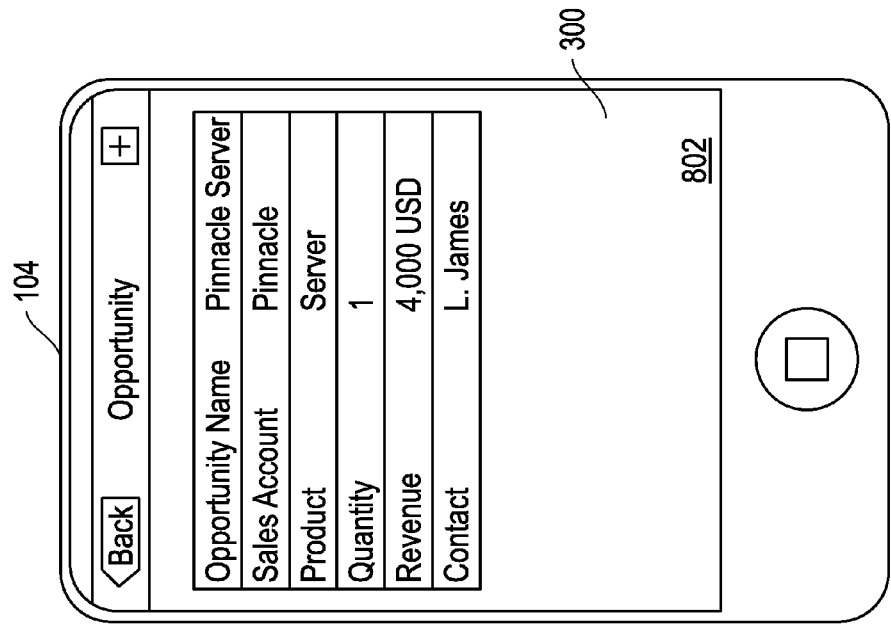
FIG. 8 graphically illustrates an example page displayed on a mobile device employed in FIG. 1.
Figure 7:
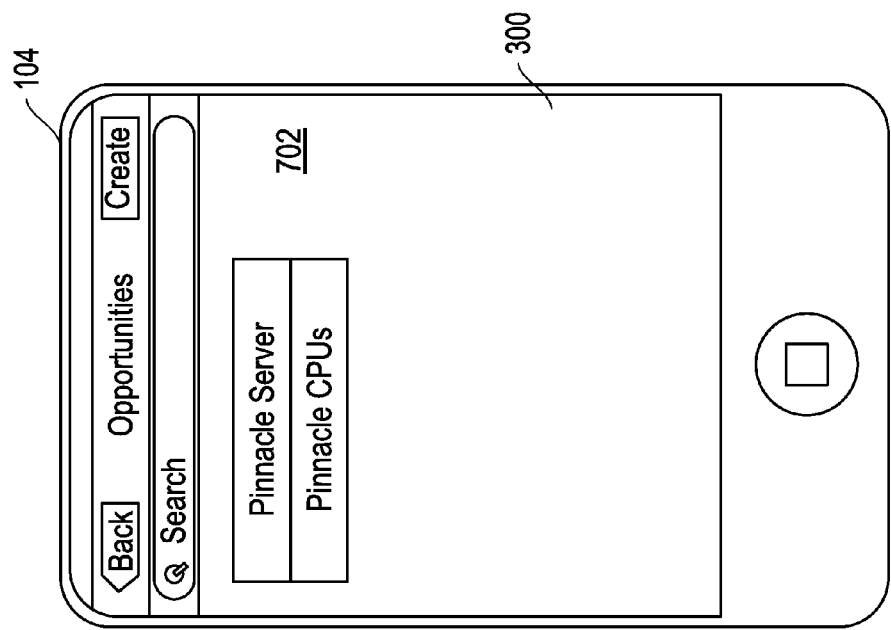
FIG. 7 graphically illustrates an example page displayed on a mobile device employed in FIG. 1.

FIG. 7 illustrates an example "Opportunities" page 702 that is displayed by mobile device 104 after it receives and deserializes the reply sent by the CRM. This page is presented in a list pattern like the opportunities page 402 shown in FIG. 4. Unlike page 402, page 702 only lists opportunities that are tied to the Pinnacle sales account. Further, like the opportunities page 402, each item displayed in page 702 is an active link to another page. To illustrate, the user can activate the "Pinnacle Server" opportunity link displayed on page 702. In response, mobile device 104 can generate and send a request for the Pinnacle Server opportunity page. This is the same or similar request that was sent by mobile device 104 prior to display of the page shown in FIG. 5. Control logic 206 receives the request from mobile device 104, and implements the same steps that were used to generate and send a reply which resulted in the page displayed in FIG. 5. More particularly, control logic 206 selects the appropriate model entry that stores data needed for the reply. In this example, the opportunity model entry is selected since the opportunity page definition is backed by a single row of data from model 204. Data from the opportunity model entry is selected and merged by serialization system 210 with the opportunity page definition, the result of which is serialized and transmitted to mobile device 104. Control logic 206 also enters a new item into the page navigation stack, which includes a copy of the opportunity page definition, the opportunity model entry identification, and an identifier unique to the Pinnacle Server opportunity. FIG. 8 illustrates the opportunity page 802 displayed by mobile device 104 after it receives and deserializes the reply. This page should be identical to the page shown in FIG. 5, unless data of the particular opportunity has since changed.

Figure 9:
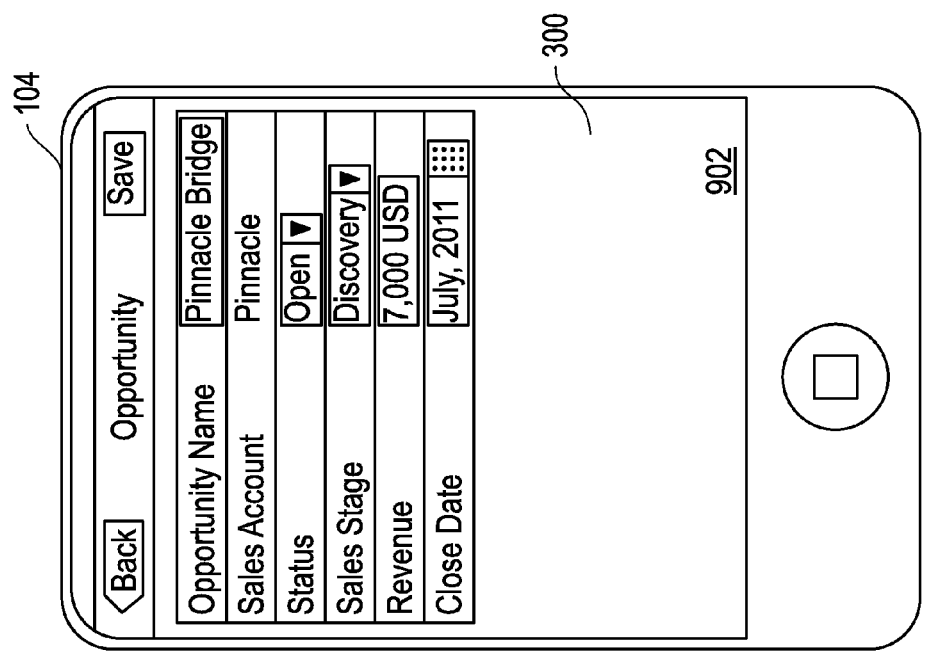
FIG. 9 graphically illustrates an example page displayed on a mobile device employed in FIG. 1.

A user may seek to create a new entry (e.g., a new opportunity, account, contact, etc.) within the logical data model. For example, the opportunities page 702 includes a "Create" button that can be activated by the user of mobile device 104. This button enables a user to create a new opportunity. To illustrate, when the user activates the create button shown within FIG. 7, mobile device 104 generates and sends a request to create a new opportunity within the Pinnacle opportunities list. CRM 206, in response, selects the editable opportunity form page definition from memory 202. This page is rendered and subsequently serialized before it is sent to mobile device 104. Mobile device 104 deserializes and displays the corresponding page. FIG. 9 illustrates an example editable form 902 displayed on mobile device 104. This page enables a user to enter data into select fields. FIG. 9 shows data entered by the user.

FIG. 6 or 7 illustrate pages that were reached via example recursive navigation. Normally, CRMs prohibit recursive navigation. With recursive navigation, a user would not be able to forward navigate from the opportunity page 502 shown in FIG. 5 to the account page 602 shown in FIG. 6. Rather, the user would be required to back navigate to the springboard page 302 shown in FIG. 3, followed by forward navigation to the page of interest, starting with the accounts icon 308. Further, a user would not be able to forward navigate from the account page 602 to reach the opportunities page 702 shown within FIG. 7. A user could back navigate to the springboard page 302 shown within FIG. 3, followed by forward navigation to an opportunities page, but the opportunities page may not be filtered to show only the list of opportunities associated with sales account "Pinnacle".

Figure 10:
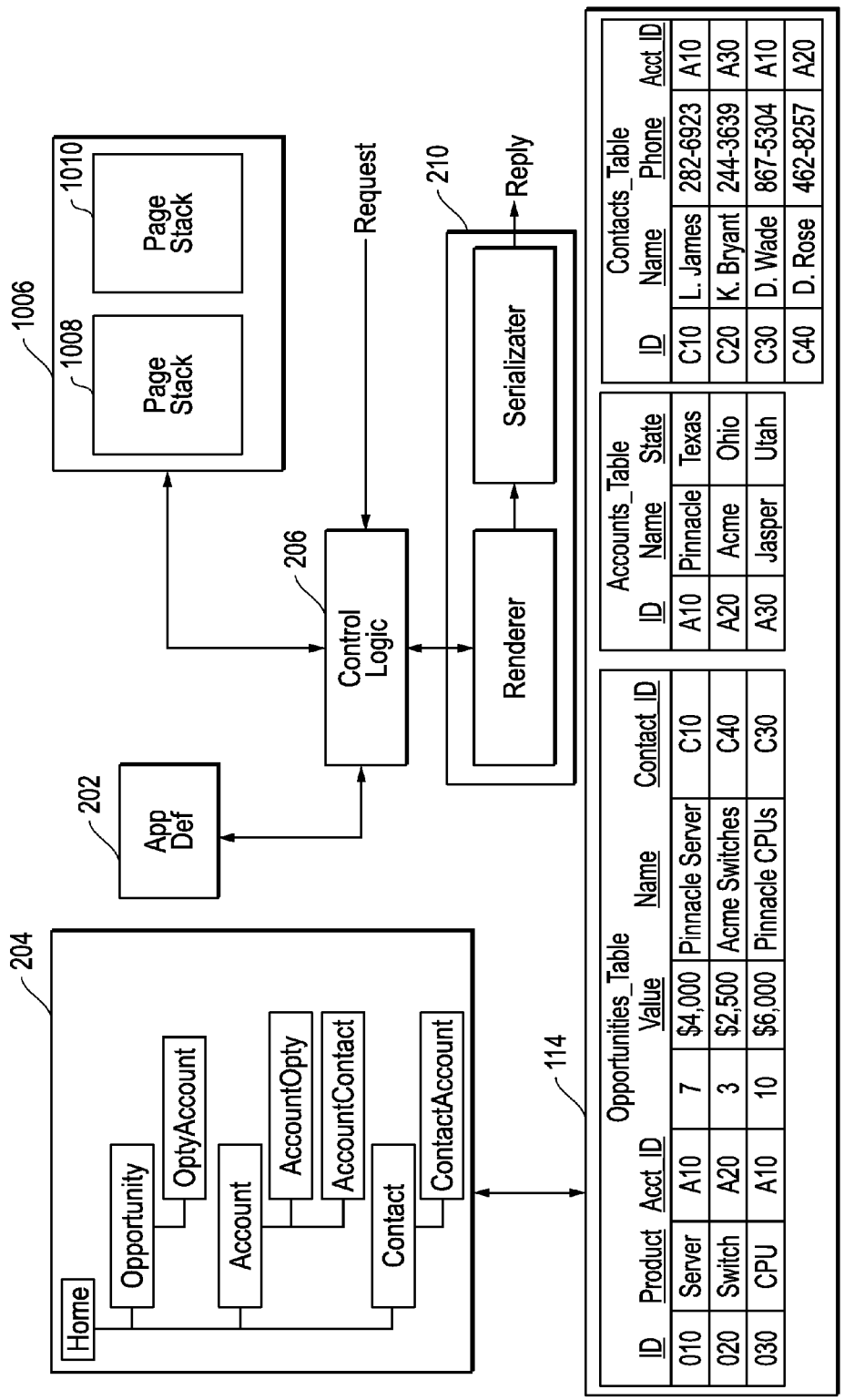
FIG. 10 graphically illustrates relevant components of an example server employed in FIG. 1.

FIG. 10 illustrates greater details of the system shown in FIG. 2. As noted above, the CRM system is capable of recursive navigation. Control logic 206 is in data communication with stack memory 1006, which is configured to store one or more page stacks, each of which corresponds to a session between the CRM system and a respective mobile device. For purposes of explanation, page stack 1010 is associated with mobile device 104. Page stack 1008 is associated with another mobile device such as mobile device 102. Logical data model 204 is structured to include root entries such as Opportunity, Account, and Contact. The Opportunities_Table, Accounts_Table, and Contacts_Table illustrated in FIG. 10 are examples of tables that support the entries in logical model 204. Logical data model 204 is structured with non-root entries in a finite relationship depth with the root entries. The logical model defines the relationship between root entries and non-root entries (e.g., AccountOpportunity). For example, the AccountOpportunity and AccountContact entries are related to the root Account entry. Model 204 is an example of one structure that enables recursive navigation.

Figure 11:
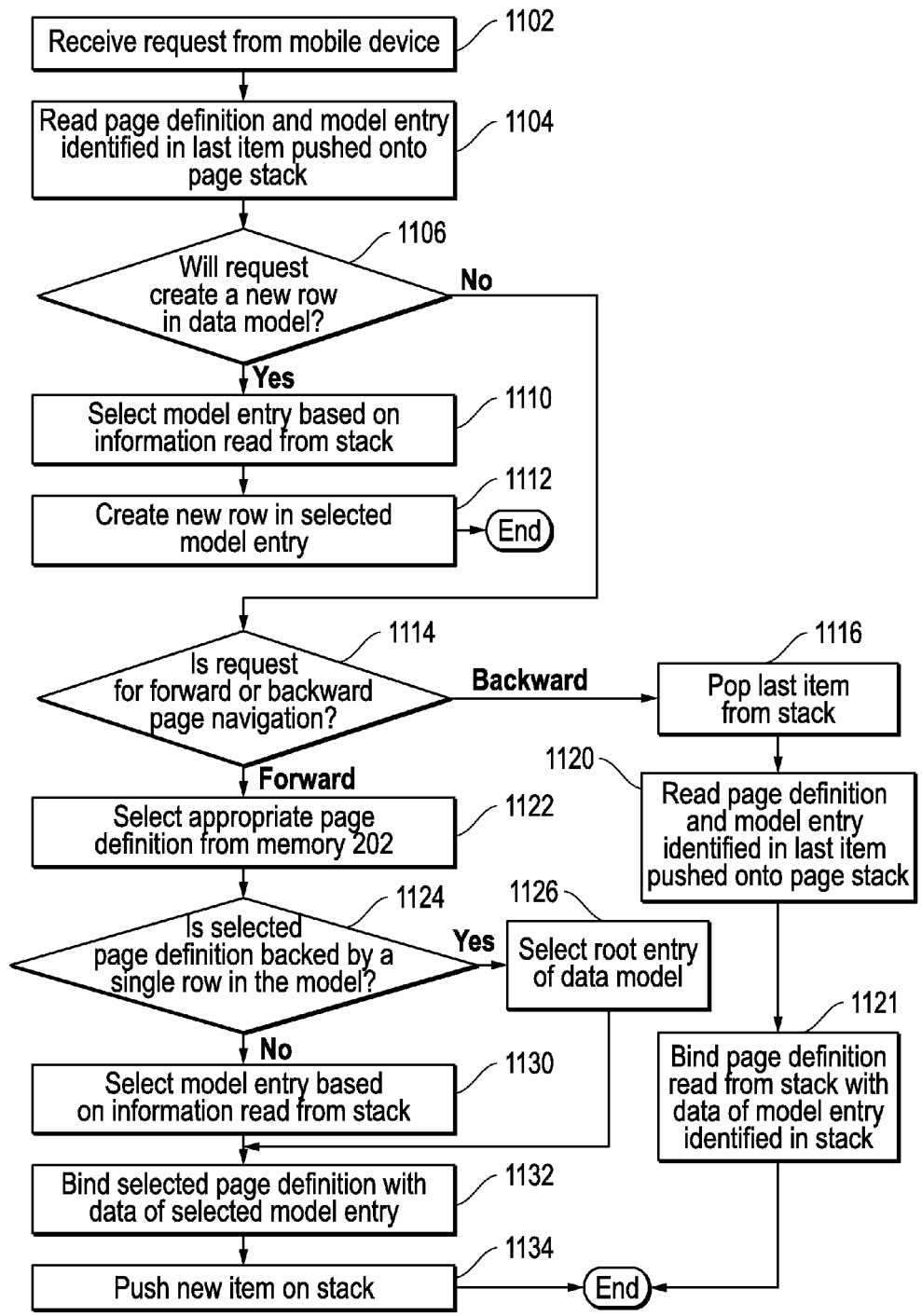
FIG. 11 illustrates relevant aspects a process implemented by the system shown in FIG. 10.

With continuing reference to FIG. 10, FIG. 11 illustrates relevant operational aspects performed by control logic 206 and serialization system 210 to enable one embodiment of recursive navigation. The process in FIG. 11 begins in step 1102 when control logic 206 receives a request from mobile device 104. In response, control logic 206 accesses the page stack identified in the request and reads the page definition, model entry identity and any other information in the last item pushed onto the page stack as shown in step 1104.

In step 1106, the control logic 206 determines whether the request will create a new entry or row in the data model 204. If the request will create a new row or edit a new row, then the control logic 206 selects an entry in the data model 204 into which the new row will be created as shown in 1110. This selection is based upon the model entry identity read from the page stack in step 1104. For example, control logic 206 may select the Opportunity entry or the AccountOpportunity entry based on the identity read from page stack 1010 in step 1104. In step 1112, control logic 206 creates a new row in this selected model entry, which in turn will be populated with data that will be received from mobile device 104. Thereafter, the process ends.

However, if it is determined in step 1106 that the request will not create a new row in the data model, the process proceeds to 1114 where control logic 206 determines whether the request is for a forward or backward page navigation. If the request is for backward page navigation, control logic 206 reads the next to last item pushed onto stack 1010. More particularly, the process proceeds to step 1116 where control logic 206 pops the last item entered into stack 1010. Then control logic 206 reads the page definition, model entry read and filter key from the most recently entered item in stack 1010 as shown in step 1120. The page definition read in step 1120 is provided to serialization system 210 along with data needed by the page definition, which is provided by the model entry that was identified in step 1120, and the filter (if needed). The data from the identified model entry may be filtered and merged with the page definition, the result of which is then serialized for transmission to the mobile device.

If, however, the request is for a forward page navigation in step 114, the process proceeds to step 1122 in which control logic 206 selects the appropriate page definition from memory 202 using information of the request received in step 1102. In step 1124, control logic 206 determines whether the page definition selected in step 1122 is backed by a single row or multiple rows of data model 204. If the page definition is backed by a single row, then at step 1126, control logic 206 selects the appropriate root entry (e.g., Opportunity, Account, Contact, etc.) from data model 204 for the data needed to render the reply. If, however, the page definition selected in step 1122 is backed by multiple rows in the data model, then in step 1130 the control logic 206 selects either a root entry or an entry related thereto based upon the model entry identity read in step 1104 and the root entry specified by the page definition selected in page 1122. More particularly, the control logic 206 select the model entry that is identified by the concatenation of the model entry identity read from stack 1010 in step 1104 and the identity of the root entry identified in the page definition selected in step 1122, if they are different. If the identities are not different, and if the identity read from stack 1010 is not "Home", then in step 1132 control logic 206 selects the root entry identified in the selected page definition. Thereafter, in step 1132, the serialization system 210 binds the selected page definition with data of the selected model entry, the result of which is transmitted to the mobile device. In step 1134, control logic 206 creates and pushes a new item onto page stack within memory 1006. This new item should include a copy of the definition that was selected in step 1130 along with an identity of the model entry that was selected in step 1130, in addition to any filter information.

Figure 12A:
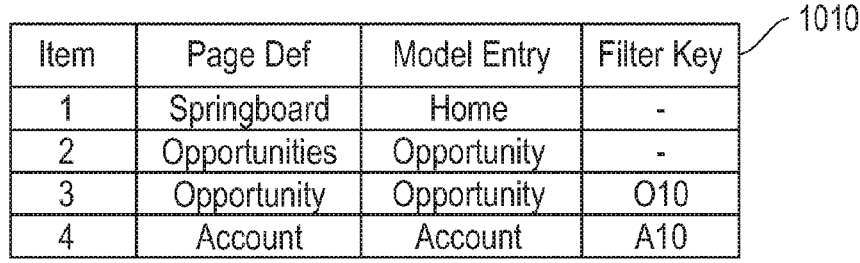
FIG. 12 illustrates relevant components of examples items stored in a stack of FIG. 11.
Figure 12B:
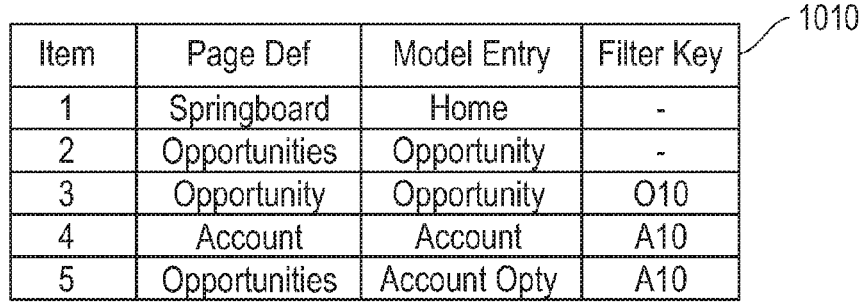
Figure 12C:
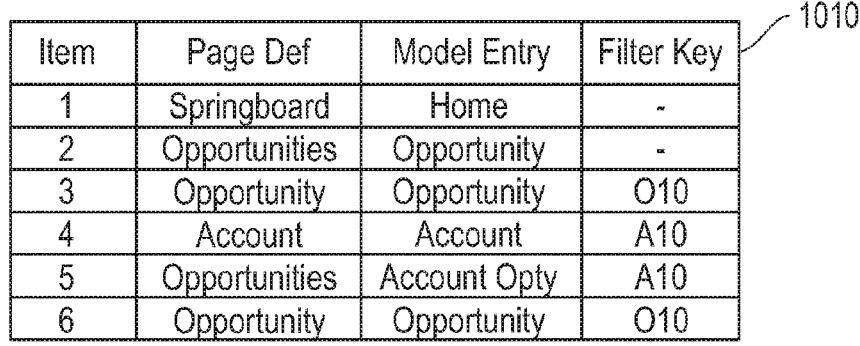
Figure 12D:
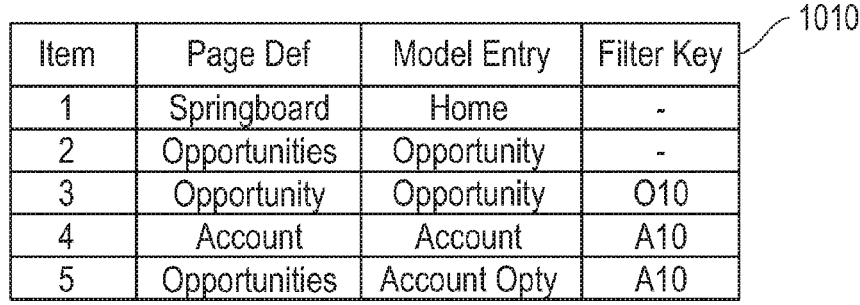

FIG. 12A-12C illustrate page stack 1010 as items are pushed onto it in response to generation and transmission of replies that resulted in pages shown within FIGS. 6, 7, and 8, respectively. Each item within the page stack 10 includes a copy of the page definition, an identity of a model entry that was used to back the corresponding page definition, and a filter key (e.g., table key) from one of the database tables that can be used as a filter if a page is redisplayed as a result of backward navigation or if a filtered list is to be presented in a page. The items in the stack are arranged in order of entry therein. Thus, in FIG. 12A, item 4 is the most recently entered item of stack 1010. Item 4 corresponds to "Pinnacle" account page 602 displayed on mobile device 104 in FIG. 6. The key A10 is provided as a filter value in the event that a reply is recreated based upon the stack item.

Figure 13:
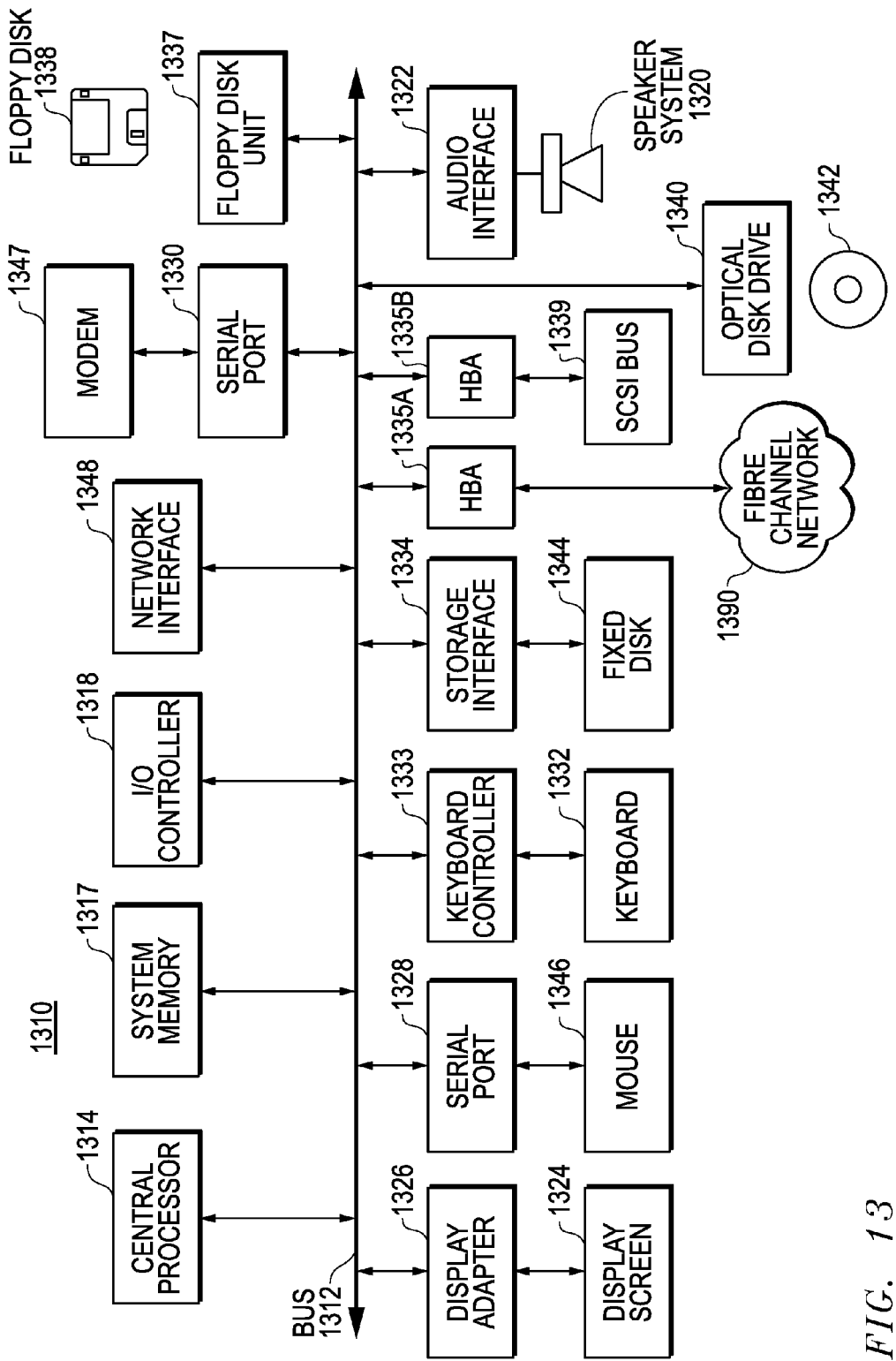
FIG. 13 is a block diagram of an example computer system that may be employed in the system of FIG. 1, 2 or 10.

FIG. 13 depicts a block diagram of a computer system 1310 suitable for implementing the present disclosure. Computer system 1310 may be illustrative of various computer systems (e.g., servers or clients) shown in FIGS. 1 and 2. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1310 are generally stored on and accessed via a computer readable medium, such as a hard disk drive (e.g., fixed disk 1344), an optical drive (e.g., optical drive 1340), a floppy disk unit 1337, or other storage medium. Additionally, applications can be in the form of electronic signals modulated in accordance with the application and data communication technology when accessed via network modem 1347 or interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

The operation of a computer system such as that shown in FIG. 13 is readily known in the art and is not discussed in detail in this application. Code for implementing a CRM can be stored in computer-readable storage media such as one or more of system memory 1317, fixed disk 1344, optical disk 1342, or floppy disk 1338. Memory 1320 is also used for storing temporary variables or other intermediate information during the execution of instructions by the processor 1310. The operating system provided on computer system 1310 may be MS-DOS®, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
receiving a first request for a first page associated with a customer relationship management (CRM) system from a mobile device;

reading a first item from a CRM page navigation stack in response to receiving the first request;
determining whether the first request is for forward page navigation or backward page navigation;
in response to determining that the first request is for forward page navigation, generating a first reply by merging a page definition for the first page with data selected from one or more of: a first object of a logical data model or a root object of the logical data model, wherein the page definition for the first page is selected from a memory of the CRM system, and wherein the first object of the logical data model is identified in the first item;
receiving a second request for a second page associated with the CRM system from the mobile device;
reading a second item from the CRM page navigation stack in response to receiving the second request;
determining whether the second request is for forward page navigation or backward page navigation; and
in response to determining that the second request is for backward page navigation:
  removing the second item from the CRM page navigation stack; and
  generating a second reply by merging a page definition for the second page with data selected from the second object but not the first object, wherein the page definition for the second page and the second object are identified in the second item.

2. The method of claim 1, wherein the selection of the data from the first object is based on metadata of the page definition for the first page, and wherein the selection of the data from the second object is based on the metadata of the page definition for the second page.

3. The method of claim 1, further comprising:
reading another item from the CRM page navigation stack in response to receiving another request from the mobile device;
generating another reply in response to reading the other item from the CRM page navigation stack, wherein the other reply comprises data from another object of the logical data model, wherein the other reply is generated as a function of another page definition, wherein the page definition for the first page and the other page definition are distinct from each other; and
pushing a third item onto the CRM page navigation stack, wherein the third item comprises an identity of the other object and an identity of the other page definition or a copy thereof.

4. The method of claim 3, further comprising:
generating an identity of the second object using information of the second item read from the CRM page navigation stack and information in the page definition; and
retrieving data from the second object in response to the generation of the identity of the second object;
wherein the second reply is generated using the data retrieved from the second object.

5. The method of claim 1, further comprising serializing the first reply for subsequent transmission to the mobile device.

6. A method comprising:
transmitting instructions to a computer system for storage in memory thereof;
wherein the instructions when executed implement a process, the process comprising:
  receiving a first request for a first page associated with a customer relationship management (CRM) system from a mobile device;
  reading a first item from a CRM page navigation stack in response to receiving the first request;
  determining whether the first request is for forward page navigation or backward page navigation;
  in response to determining that the first request is for forward page navigation, generating a first reply by merging a page definition for the first page with data selected from one or more of: a first object of a logical data model or a root object of the logical data model, wherein the page definition is selected from a memory of the CRM system, wherein the page definition for the first page is selected from a memory of the CRM system, and wherein the first object of the logical data model is identified in the first item;
  receiving a second request for a second page associated with the CRM system from the mobile device;
  reading a second item from the CRM page navigation stack in response to receiving the second request;
  determining whether the second request is for forward page navigation or backward page navigation; and
  in response to determining that the second request is for backward page navigation:
    removing the second item from the CRM page navigation stack; and
    generating a second reply by merging a page definition for the second page with data selected from the second object but not the first object, wherein the page definition for the second page and the second object are identified in the second item.

7. The method of claim 6, wherein the selection of the data from the first object is based on metadata of the page definition for the first page, and wherein the selection of the data from the second object is based on the metadata of the page definition for the second page.

8. The method of claim 6, wherein the process further comprises:
reading another item from the CRM page navigation stack in response to receiving another request from the mobile device;
generating another reply in response to reading the other item from the CRM page navigation stack, wherein the other reply comprises data from another object of the logical data model, wherein the other reply is generated as a function of another page definition, wherein the page definition for the first page and the other page definition are distinct from each other; and
pushing a third item onto the CRM page navigation stack, wherein the third item comprises an identity of the other object and an identity of the other page definition or a copy thereof.

9. The method of claim 8, wherein the process further comprises:
generating an identity of the second object using information of the second item read from the CRM page navigation stack and information in the page definition; and
retrieving data from the second object in response to the generation of the identity of the second object;
wherein the second reply is generated using the data retrieved from the second object.

10. The method of claim 6, wherein the process further comprises serializing the first reply for subsequent transmission to the mobile device.

11. A non-transitory computer readable memory comprising instructions, wherein a method is implemented in response to executing the instructions, the method comprising:
    receiving a first request for a first page associated with a customer relationship management (CRM) system from a mobile device;
    reading a first item from a CRM page navigation stack in response to receiving the first request;
    determining whether the first request is for forward page navigation or backward page navigation;
    in response to determining that the first request is for forward page navigation, generating a first reply by merging a page definition for the first page with data selected from one or more of: a first object of a logical data model or a root object of the logical data model, wherein the page definition for the first page is selected from a memory of the CRM system, and wherein the first object of the logical data model is identified in the first item;
    receiving a second request for a second page associated with the CRM system from the mobile device;
    reading a second item from the CRM page navigation stack in response to receiving the second request;
    determining whether the second request is for forward page navigation or backward page navigation; and
    in response to determining that the second request is for backward page navigation:
        removing the second item from the CRM page navigation stack; and
        generating a second reply by merging a page definition for the second page with data selected from the second object but not the first object, wherein the page definition for the second page and the second object are identified in the second item.

12. The non-transitory computer readable memory of claim 11, wherein the selection of the data from the first entry is based on metadata of the page definition for the first page, and wherein the selection of the data from the second entry is based on the metadata of the page definition for the second page.

13. The non-transitory computer readable memory of claim 11, wherein the method further comprises:
    reading another item from the CRM page navigation stack in response to receiving another request from the mobile device;
    generating another reply in response to reading the other item from the CRM page navigation stack, wherein the other reply comprises data from another object of the logical data model, wherein the other reply is generated as a function of another page definition, wherein the page definition and the other page definition are distinct from each other; and
    pushing a third item onto the CRM page navigation stack, wherein the third item comprises an identity of the other object and an identity of the other page definition or a copy thereof.

14. The non-transitory computer readable memory of claim 13, wherein the method further comprises:
    generating an identity of the second object using information of the second item read from the CRM page navigation stack and information in the page definition; and
    retrieving data from the second object in response to the generation of the identity of the second object;
    wherein the second reply is generated using the data retrieved from the second object.

15. The non-transitory computer readable medium of claim 11, wherein the method further comprises serializing the first reply for subsequent transmission to the mobile device.

* * * * *